United States Patent [19]

Beggs

[11] 4,132,444
[45] Jan. 2, 1979

[54] EXPANDABLE VEHICLE

[76] Inventor: George Beggs, 305 Riverside Dr., New York, N.Y. 10025

[21] Appl. No.: 845,541

[22] Filed: Oct. 26, 1977

[51] Int. Cl.² ............................................. B60P 3/34
[52] U.S. Cl. ........................................ 296/26; 52/65
[58] Field of Search ............... 296/26, 27, 23 R, 23 C, 296/99 R, 100, 104; 52/65-71

[56] References Cited

U.S. PATENT DOCUMENTS

| 3,351,373 | 11/1967 | Christin | 296/26 |
| 4,057,284 | 11/1977 | Blank | 296/27 |

Primary Examiner—Philip Goodman
Attorney, Agent, or Firm—Hubbell, Cohen, Stiefel & Gross

[57] ABSTRACT

A body portion of a standard type vehicle, such as the rear body panel of an automobile or a side body panel of a van, is pivotally connected to the balance of the vehicle by an accordion folding hood to define an original enclosed usable volume in the collapsed position of the hood, which volume is bisected by a diagonal extending through the pivot axis for the movable body portion. The diagonal defines the confronting edges of the movable body portion with the balance of the vehicle in the collapsed position of the hood. The body portion in the collapsed position of the hood defines a half volume for the enclosed usable volume which when pivotally rotated about the pivot axis through an angle of 90 degrees describes an arch for the diagonal which defines a path of travel for the accordion hood to create a new expanded enclosed usable volume having an increased headroom and a total enclosed volume greater than twice that of the original enclosed volume. Many variations in this basic arrangement are described to provide a variety of configurations of cubical or rectangular volumes.

25 Claims, 31 Drawing Figures

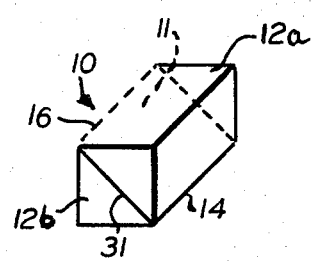
FIG. IA.
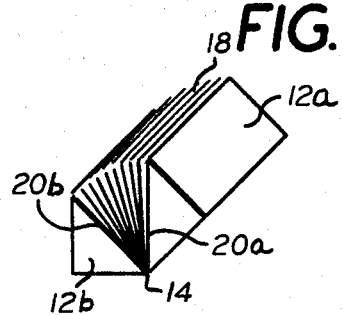
FIG. IB.
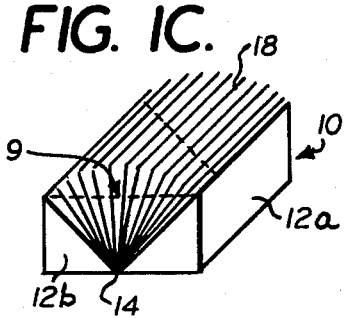
FIG. IC.
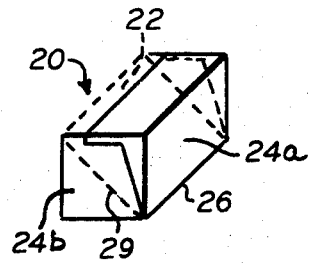
FIG. ID.
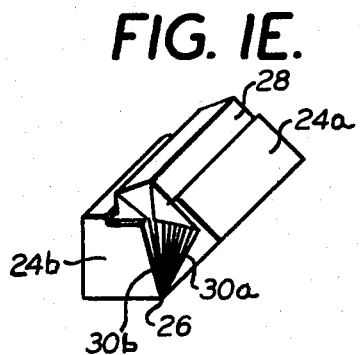
FIG. IE.
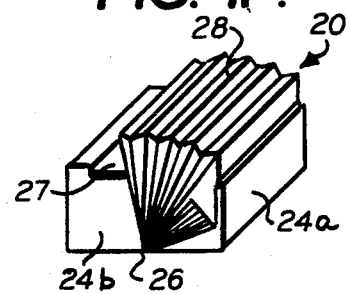
FIG. IF.
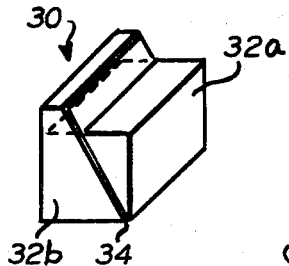
FIG. IG.
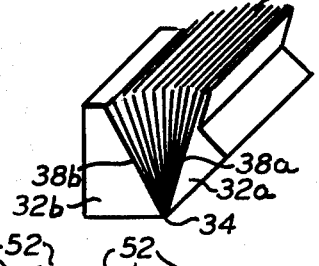
FIG. IH.
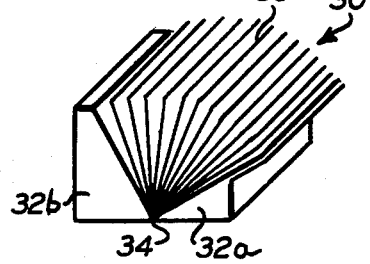
FIG. II.
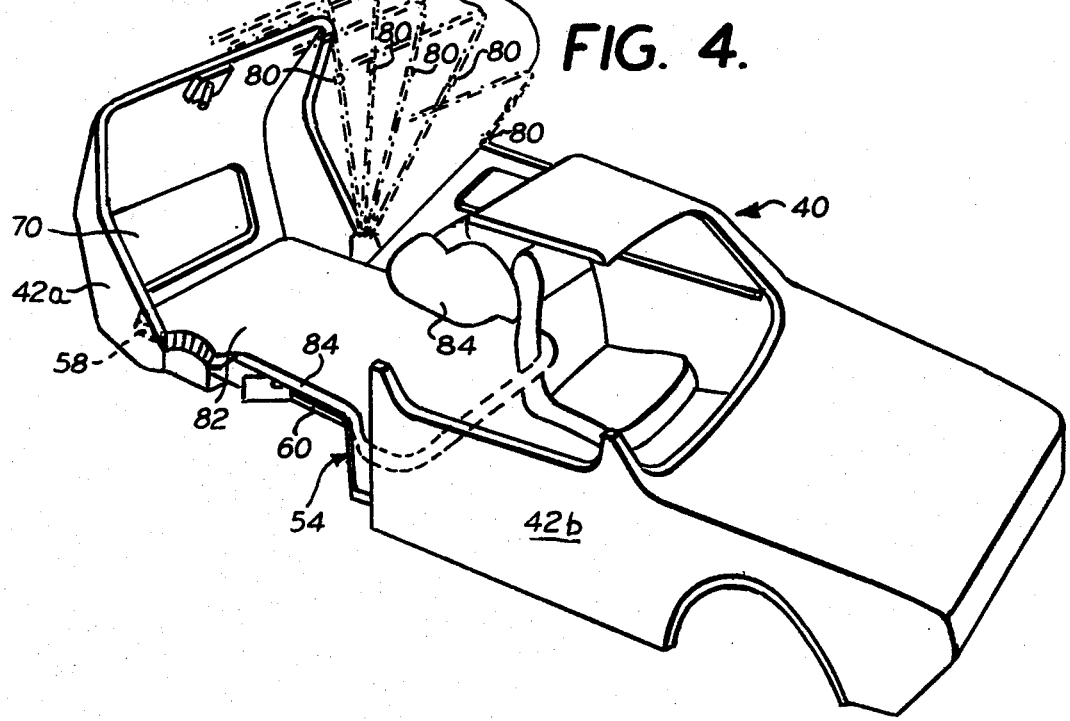
FIG. 4.

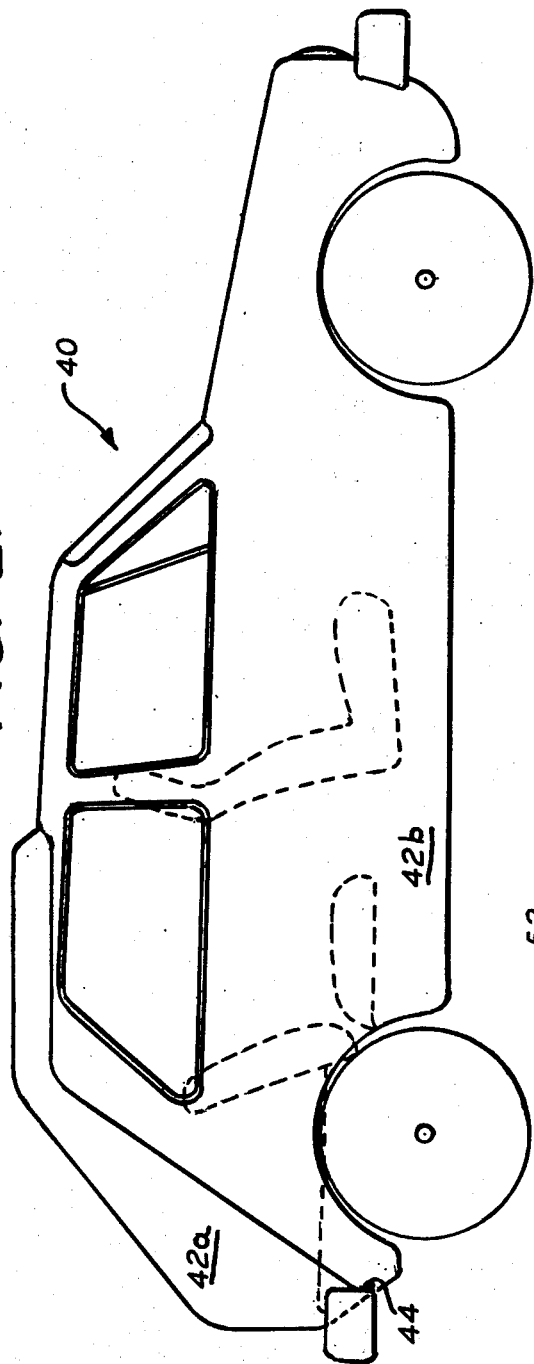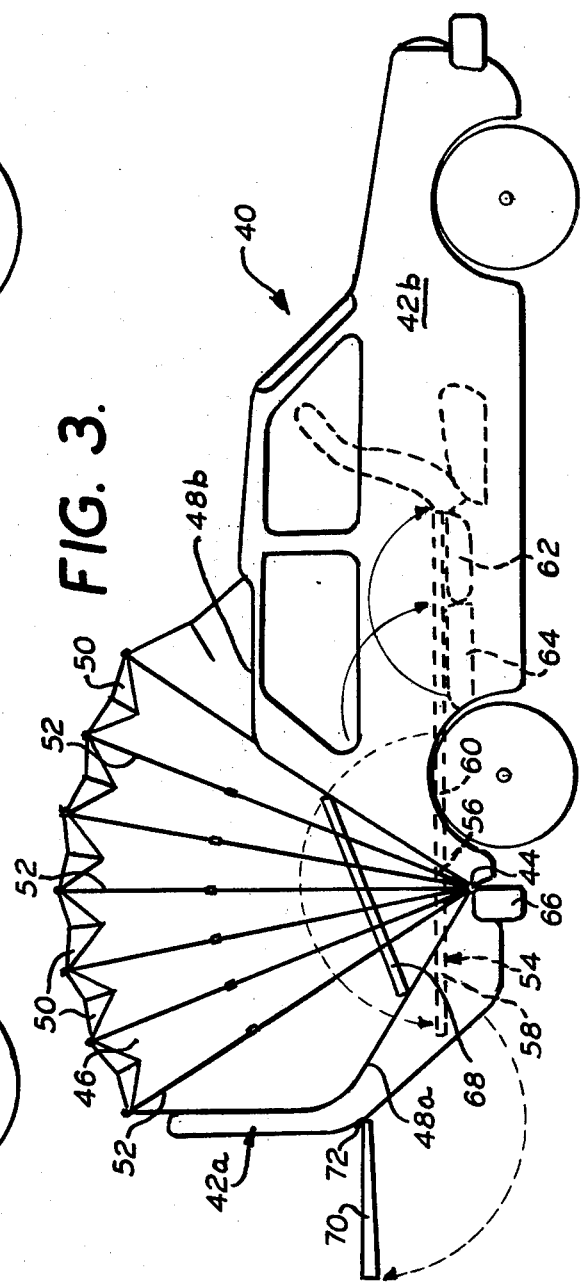

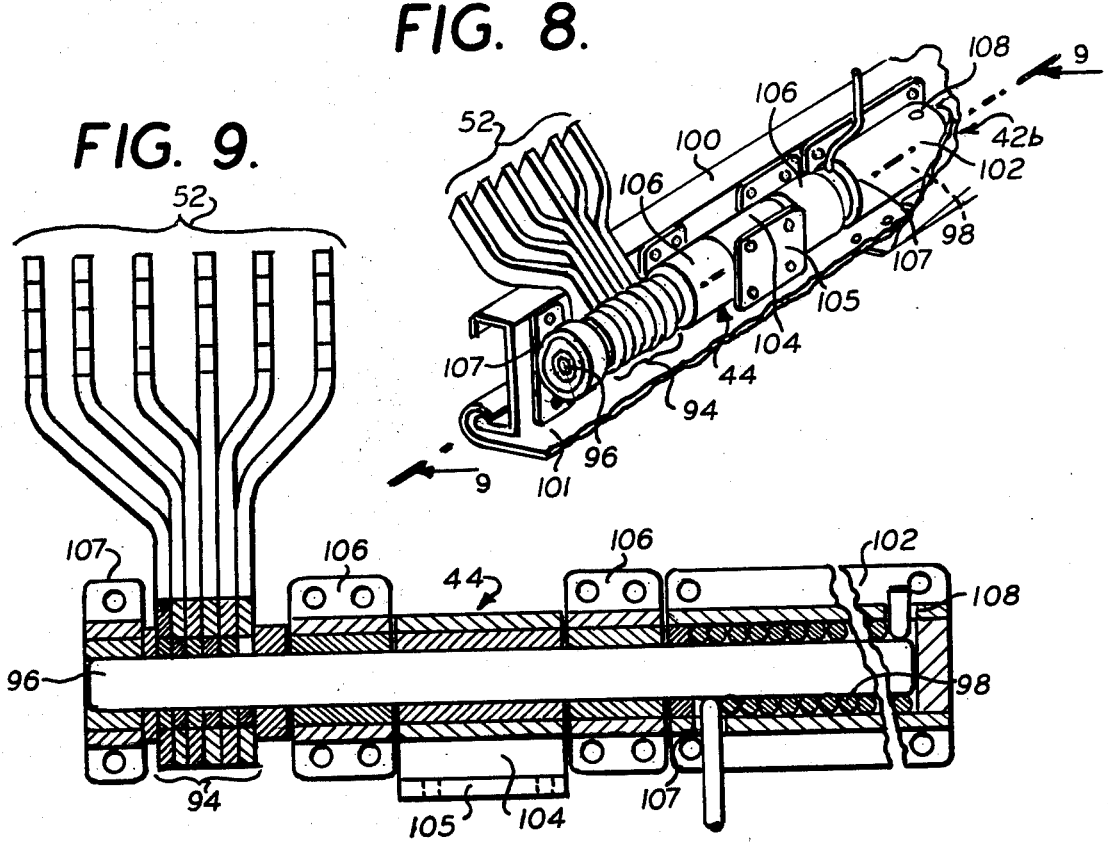
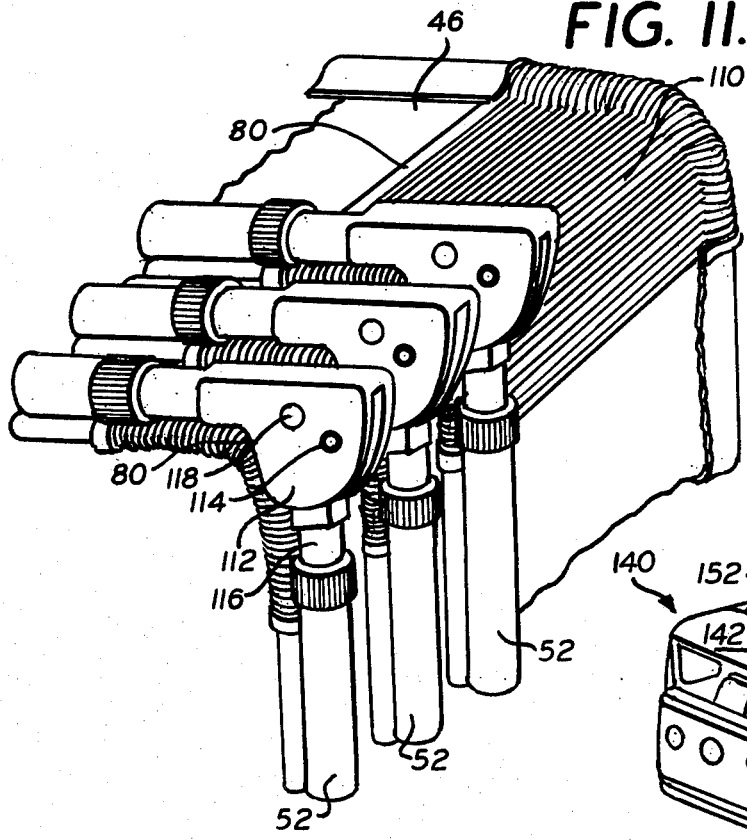
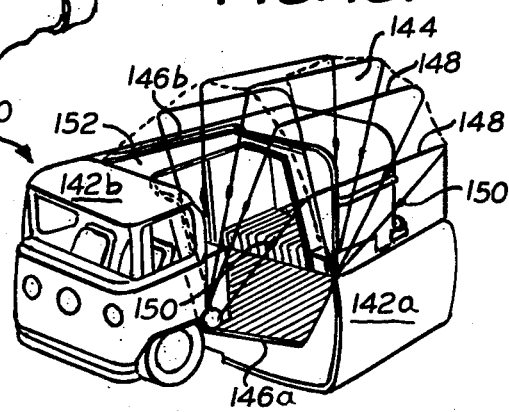

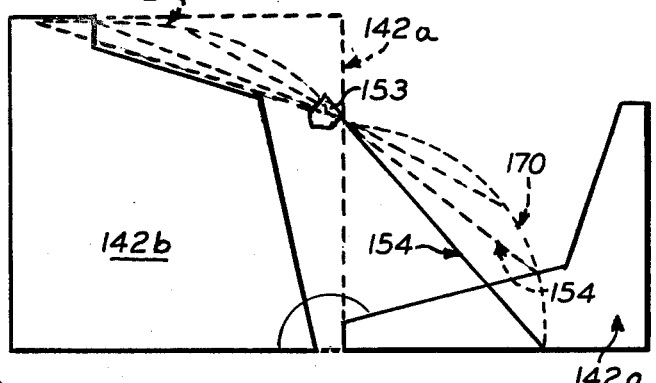
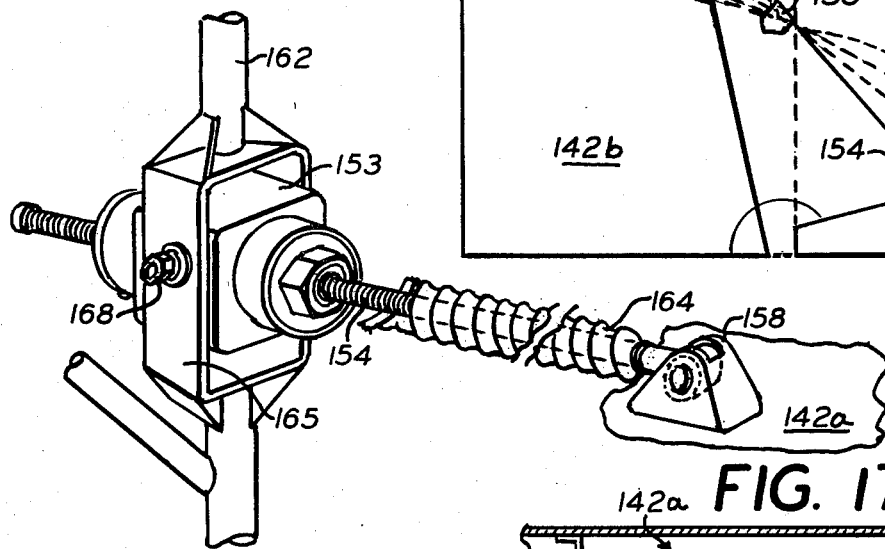
FIG. 15. FIG. 16.
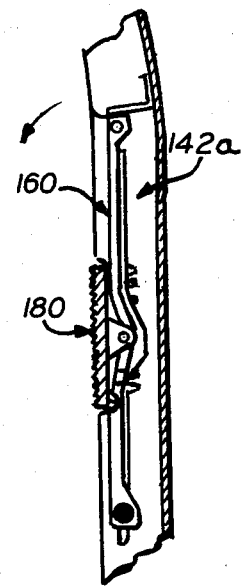 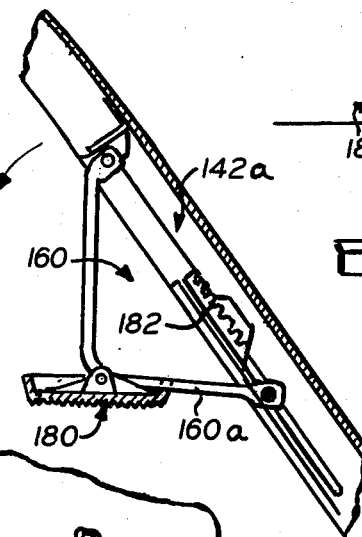 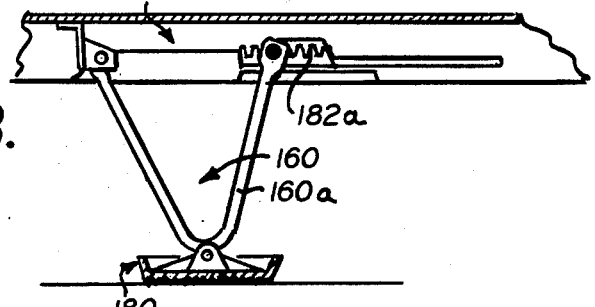
FIG 17A. FIG 17B. FIG. 17C. FIG. 17D.
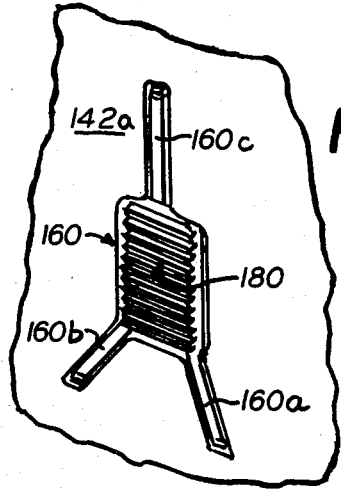
FIG. 17E.

EXPANDABLE VEHICLE

BACKGROUND OF THE INVENTION

1. Field of the Invention

This invention relates generally to vehicles which expand to provide a new enclosed usable volume from an original enclosed usable volume, and more particularly to such vehicles wherein the new enclosed usable volume has an increased headroom and a total enclosed volume greater than twice that of the original enclosed volume.

2. Description of Prior Art

Expandable structures such as trailers, cars and other vehicles are well known in the art as exemplified by U.S. Pat. Nos. 2,168,062; 2,569,641; 2,501,027; 1,477,111; 2,636,773; 3,558,181; 3,352,596; 2,749,174; 2,990,214; 3,596,416; 3,908,304 and 2,938,748. For example, U.S. Pat. No. 2,501,027 discloses a station wagon or sedan having a telescoping body in which an inner body is slidably arranged inside the outer body of the vehicle and may be slidably expanded to almost double the enclosed volume. Such a slidable telescoping arrangement is also disclosed in U.S. Pat. No. 2,636,773 for a trailer. The use of telescoping compartments in a vehicle to provide a usable space from an unusable one is also well known as shown in U.S. Pat. Nos. 2,168,062 and 2,569,641. Thus, U.S. Pat. No. 2,569,641 discloses a frame which is pivotally connected to the sidewall of a trailer to be swung down from an unusable collapsed position to an open position in which a telescoped canopy for enclosing a bed within the trailer is provided. Similarly, U.S. Pat. No. 2,168,062 discloses an expandable trailer in which the end walls may be swung outwardly from a collapsed unused position to an open position in which added space is provided at both ends of the trailer. U.S. Pat. Nos. 2,749,174; 1,477,111; 3,596,416; 2,990,214; 3,558,181 and 3,352,596 are all directed to what are commonly termed "knock-down" or collapsible structures such as tents or trailers. Such collapsible or "knock-down" structures are also generally disclosed in U.S. Pat. Nos. 3,908,304 and 2,938,748. Such "knock-down" structures are not satisfactory where it is desired to have usable space with headroom in a vehicle in the collapsed or "knock-down" position. This is also true for the telescoping arrangements disclosed in U.S. Pat. Nos. 2,569,641 and 2,168,062. With respect to the aforementioned structures disclosed in U.S. Pat. Nos. 2,501,027 and 2,636,773, these structures are not satisfactory as they are mechanically cumbersome and do not readily increase the headroom of the expanded volume as well as provide an expanded volume which is greater than twice that of the original unexpanded volume.

These disadvantages of the prior art are overcome by the present invention.

SUMMARY OF THE INVENTION

An expandable vehicle is provided which comprises a vehicle body defining an outer configuration for the vehicle, with the vehicle body comprising a movable body panel member, such as a rear body panel or a side body panel in the case of an automobile type vehicle, and a stationary body frame. In addition, means are provided for joining the movable body panel member to the stationary body frame along a pair of confrontable edges disposed in a plane defining the diagonal of an original enclosed usable volume. This joining means comprises a collapsible accordion type hood and means pivotally connecting the movable body panel member to the stationary body frame for pivotal movement about a pivot axis. The movable body panel member is pivotally movable about the pivot axis through an angle of substantially 90 degrees from a closed position in which the confrontable edges substantially confront each other and the accordion type hood is collapsed to provide the original enclosed volume to an open position in which the accordion type hood is expanded to provide an enclosed expanded usable volume. The pivot axis is in a base plane through which the diagonal defining plane extends. The body panel member in the closed position substantially defines a half volume for the original enclosed volume with the original enclosed volume being substantially bisected by the diagonal defining plane. The accordion type hood circumscribes a path of travel during the pivotal movement between the open and closed positions which describes an arch for creating an increased headroom for the enclosed expanded usable volume over that of the original enclosed volume while providing a total enclosed expanded volume greater than twice that of the original enclosed usable volume in the open position. Thus, substantially the total vehicle enclosed volume may be used in both the open and closed positions of the body panel member with an increase in both headroom and volume being provided in the open position of the body panel member. The accordion type hood may comprise means for providing a dogleg type bend therein for providing an offset from the diagonal defining plane. In addition, the body panel member and the stationary body frame may be contiguous along a pair of normally opposed edges to define the original enclosed usable volume with the confrontable edges comprising the normally opposed edges and with the accordion type hood comprising means for extending the accordion type hood along the confrontable edges above the normally opposed edges. The movable body panel member may comprise a storage compartment for the collapsed accordion type hood for providing a substantially unaltered vehicular interior configuration in the closed position of the body panel member and, moreover, a portion of the stationary body frame adjacent the movable body panel member may also comprise a storage compartment for the collapsed accordion type hood which is cooperable with and in communication with the body panel member storage compartment for providing the substantially unaltered vehicular interior configuration in the closed position of the body panel member. If the expandable vehicle is an automobile type vehicle, such as a compact car, and the movable body panel member comprises a rear body panel thereof, the car having a rear bumper mounted to the rear body panel, then the aforementioned joining means may comprise means for enabling transfer of impact loads from the rear bumper to the stationary body frame through the pivotal connection in the closed position while enabling downward rotation of the rear bumper as the body panel member is moved to the open position. In such an instance, the pivotal connection may comprise a hinge means and the rear bumper mounting means may comprise shock absorber means extending between the rear bumper and the stationary body frame in the closed position with the shock absorber means having plunger means therein and with the rear bumper being mounted to the plunger means to enable the impact loads to be transferred from the rear bumper through the hinge means to the stationary body frame in the closed position. If the expandable automobile type vehicle is a van, the movable body panel may comprise a side body panel of the van with the joining means further comprising drive motor means, such as a pivotally mounted drive motor, for moving the side body panel between the open and closed positions.

Another feature of the present invention is the provision of the aforementioned increased headroom or interior height in the expanded vehicle so as to provide standing room where the original headroom of the original enclosed volume did not, such as for example in a compact car in which the rear only enables sitting room in the closed position of the rear body panel.

BRIEF DESCRIPTION OF DRAWINGS

FIGS. 1A-1I are diagrammatic illustrations, in perspective, of the basic underlying geometric concepts upon which the present invention relies;

FIG. 2 is a side elevational view of the preferred illustrative embodiment of an expandable automobile type vehicle and particularly a compact car in accordance with the present invention, illustrating the vehicle in the closed or unexpanded configuration thereof;

FIG. 3 is a side elevational view of the vehicle of FIG. 2 in the open or expanded configuration thereof;

FIG. 4 is a fragmentary cut-away perspective view of the vehicle as shown in FIG. 3;

FIG. 8 is a perspective fragmentary detailed view of another portion of the vehicle as preferred in the present invention;

FIG. 9 is a sectional view taken along line 9—9 in FIG. 8;

FIG. 11 is a partial perspective view of the folding hood and hood support members of FIG. 10 in a folded position;

FIG. 13 is a perspective view of another automobile type vehicle, and particularly a van, in the open or expanded configuration in accordance with the present invention;

FIG. 15 is a perspective view of a preferred motor drive unit for opening and closing the present vehicle hood;

FIG. 16 is a diagrammatic illustration of the geometry of the drive motor and threaded rod of the embodiment of FIGS. 14A-14C and 15 during opening and closing; and FIGS. 17A-17E are diagrammatic illustrations of the support stand for the side panel of the embodiment of FIGS. 14A-14C and 15 as the moving panel moves between the open and closed position.

DETAILED DESCRIPTION OF THE INVENTION

Figure 5:
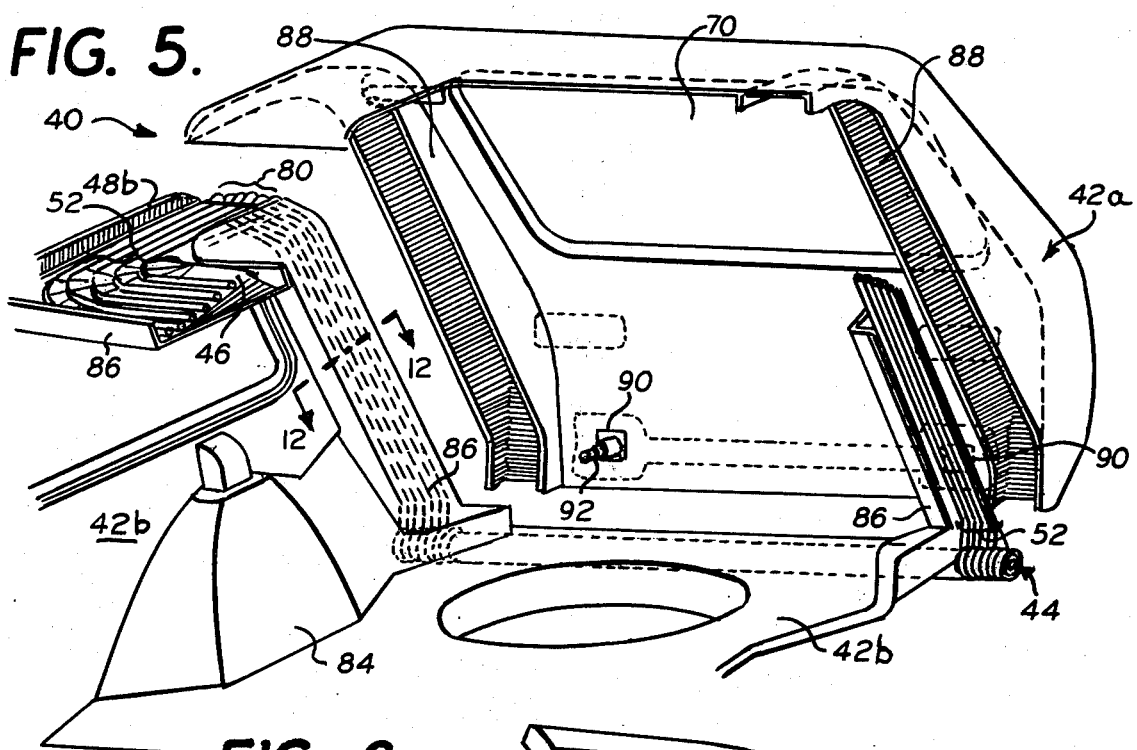
FIG. 5 is a partially exploded fragmentary cut-away perspective view of the vehicle as shown in FIG. 2.

Referring now to the drawings and initially to FIGS. 1A, 1B and 1C, the basic underlying geometric principals upon which the present invention is based are illustrated.

The basic underlying concept of the present invention, as explained below, may be understood by representations of a cubic or rectangular volume which is intersected by an imaginary plane diagonally from corner to corner so that the volume is bisected.

FIGS. 1A-1C refer to various stages of the same embodiment as it moves from a closed position (FIG. 1A) to an open position (FIG. 1C). FIG. 1A illustrates a rectangular compartment 10 such as would be enclosed by an automobile type vehicle, such as a car or van, the compartment 10 being bisected by an imaginary diagonal plane 11 which includes edges 14, 16 of opposed pairs of compartment walls. It can be seen that the plane 11 defines two compartment portions 12a, 12b within the compartment 10 which compartment 10 is shown in the closed position in FIG. 1A. As shown in FIGS. 1B and 1C, if the compartment portions 12a, 12b are hinged to one another for pivotal movement about the edge 14, and are otherwise separated from one another along a line of separation defined by the intersection of the plane 11 with the compartment 10 to provide a air of half volumes, it is possible to provide an expanded enclosed volume by way of an accordion folding hood covering 18 by rotation of one of the half volumes 12a approximately 90 degrees about one of the two edges common to both half volumes. The hood 18 is joined at opposite ends thereof to confronting edges 20a, 20b of compartment portions 12a, 12b, respectively. When compartment 10 is in the fully opened or expanded configuration as shown in FIG. 1C, the top of the hood 18 defines or circumscribes a circular arc terminating along the furthest separated edges of compartment portions 12a, 12b. It can be shown that if the original volume is a cube, the ratio of increase in volume enclosed by compartment 10 is 2.54 to 1, or 154% greater than when in its closed configuration (FIG. 1A) to that obtained with the expanded or open configuration of FIG. 1C. In addition, the arch described by the top of hood 18 creates an increased headroom for the enclosed expanded volume as shown in FIG. 1C by the dotted line 9 which represents the original headroom. This idea of providing such a relatively large increase in the normally enclosed volume of a compartment such as 10 while also increasing the headroom such as illustrated in FIGS. 1A-1C, is the basis of an important feature of the present invention and is not shown or suggested in any of the prior art discussed above.

The basic concept as illustrated in FIGS. 1A-1C gives rise to other structural techniques for expanding a compartment of given spatial volume to an expanded enclosure having more than twice the given volume by use of an accordion folding hood such as 18.

Thus, for example, FIGS. 1D-1F illustrate a compartment 20 which, instead of being separable into two compartments defined by a diagonal plane such as 22, has one portion 24a which in profile has a "dog leg" bend. Portion 24a is joined for relative pivotal movement to the remaining portion 24b along edge 26. An accordion folding hood 28 is joined at opposite ends thereof to confronting edges 30a, 30b on the separable compartment portions 24a, 24b, respectively, the accordion hood 28 being arranged to fold over at the "dog leg" bend 27 when compartment portion 24a is swung into closed confronting relationship with compartment portion 24b as in FIG. 1D.

The arrangement of FIGS. 1D-1F has the advantage of providing a maximum vertical height H within the expanded compartment 20 (FIG. 1E) which is greater than the length of diagonal line 29 defined by imaginary plane 22 (FIG. 1D), whereas the expanded compartment 10 of FIGS. 1A-1C has a maximum vertical height which is determined by the length of diagonal 31. The expanded compartment 20 thereby has an even greater percentage volume increase over its unexpanded volume than the increase obtained by expanding the compartment 10 of FIGS. 1A-1C. Further, because the line of separation between compartment portions 24a, 24b does not coincide with the diagonal line 29, a passageway including a door leading into and out of compartment 20 may be easily located on the end wall of compartment portion 24b without interference from diagonally disposed hood support members as would be encountered in connection with the folding hood 18 as it is embodied within compartment 10 of FIGS. 1A-1C.

Another expandable compartment 30 is shown in FIGS. 1G-1I. The volume enclosed by the expanded compartment 30 as in FIG. 1I is also substantially greater than the volume within closed compartment portions 32a, 32b in FIG. 1G. Compartment portions 32a, 32b are joined to each other for relative pivotal movement about an axis 34 which is in the vicinity of and substantially parallel to the outside lower right edge of compartment 30. A passageway may also be provided on the endwalls of the compartment portion 32b without interference from any supporting structures for the folding hood 36.

While the basic concept of the present invention as set forth above and illustrated in FIGS. 1A-1C, 1D-1F and 1G-1I has been explained with regard to three particular expandable compartments 10, 20 and 30, the scope of the present invention is in no way intended to be limited in its application to vehicles which resemble in shape the closed compartments so far disclosed. In fact, one of the preferred embodiments of the present invention, as explained below, is embodied in an automobile type vehicle, such as what is commonly termed a compact car, whose dimensions may resemble an automobile known popularly as the "Volkswagon Rabbit", this embodiment being shown in an unexpanded configuration in FIG. 2.

A vehicle 40 such as the standard 1977 Volkswagon Rabbit appears in FIG. 2 as modified according to the present invention and in an unexpanded, normal running configuration. The preferred expansion technique applied to the vehicle 40 most closely resembles that shown and described above in connection with FIGS. 1D-1F. Thus, a generally "dog leg" shaped body portion 42a is joined for relative pivotal movement to the remaining vehicle body 42b by a hinge assembly 44 having an axis substantially parallel to and in the vicinity of the lower rear edge of the vehicle 40. It will be seen that the unexpanded vehicle 40 of FIG. 2 is preferably nearly identical in profile to the conventional vehicle as it appears before modification according to the present invention, except for a relatively slight bulge extending from the mid-roof line down across the back of the vehicle 40, owing to the gernally "dog leg" shape of the separable moveable body portion 42a.

Generally speaking, the expandable vehicle 40 shown in FIGS. 2 and 3 will preferably undergo only minor variation regarding the usable interior space occupied within the vehicle before it is modified in accordance with the present invention, i.e. the standard production automobile.

Figure 12:
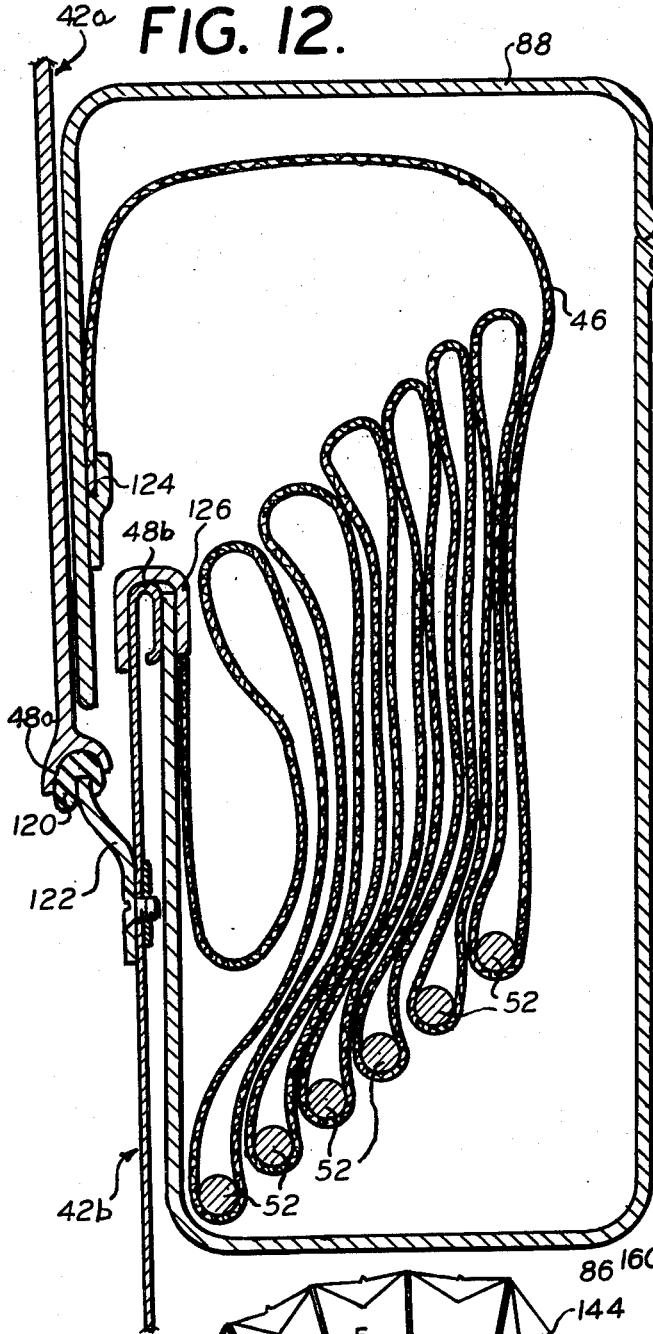
FIG. 12 is a sectional view taken along line 12—12 in FIG. 5.

Such minor variations preferably include, by way of example;

(a) modification of the rear seat to allow forward folding of both the bottom cushion 62 and the seat back 64 to form a leveled platform (FIG. 3);

(b) an approximate two inch reduction in head room above the rear seat due to the presence of a hood storage compartment (FIG. 5);

(c) an approximate five inch intrusion on either side of the standard vehicle into the rear storage/luggage compartment owing to the presence of the hood storage compartment (FIGS. 5 and 12);

(d) the addition of an approximately one inch thick foam plastic folding pad, preferably stored in the rear storage/luggage compartment for the purpose of providing a sleeping surface to be used inside the vehicle when expanded: and (e) a modified panel 54 in the rear storage/luggage compartment which folds towards the rear when the vehicle is expanded in order to provide support for the sleeping pad (FIG. 3).

Assuming that the vehicle 40 is the aforementioned standard 1977 "Volkswagon Rabbit", which is a compact car, and which is modified according to the present invention, vehicle 40 can be expanded to provide an enclosed, hooded sleeping surface which is, by way of example, six feet (182.9 cm) in length and three feet, four inches (101.6 cm) wide at the narrowest point between wheel wells 84 as shown in FIG. 4. The maximum height of the expanded accordion hood 46 as shown in FIG. 3 is four feet, six inches (137.2 cm) above the sleeping surface.

According to the invention, the rear body panel and a portion of the rear side panel of the standard vehicle are preferably modified to accommodate the required storage compartment for the accordion hood 46, with the details of the storage compartment being set out below in connection with FIGS. 5 and 12.

The standard rear panel and a portion of the rear side panel of the original vehicle are replaced by moveable body portion 42a which can be constructed of fiberglass, for example, and would be only slightly larger in height and width than the combined original equipment panels. Further, the confronting edges 48a of panel 42a should preferably accommodate weather proofing seals which may be conventional and are therefore not shown in the drawing, the seals being arranged to compress against corresponding confronting edges 48b of vehicle body or stationary body frame 42b to form a weather tight seal when body portion 42a is securely closed against vehicle body 42b as shown in FIG. 2.

It will therefore be appreciated that the use of the preferred vehicle expansion technique as shown and described in connection with FIGS. 1D-1F when applied to the body structure of a conventional automobile type vehicle such as the 1977 "Volkswagon Rabbit" in which the movable body panel 42a subsequently defines a half volume for the original enclosed volume, allows the vehicle to remain substantially unchanged with respect to existing windows and doors and, even more importantly, only minimally, at worst, affects the normally provided interior room of the vehicle.

FIG. 3 illustrates some of the basic structure associated with the expansion of vehicle 40 from the normal running configuration shown in FIG. 2. Specifically, its accordion folding hood 46 is joined at opposite ends thereof in the vicinity of confronting edges 48a, 48b, to the moveable body portion 42a, and the vehicle body 42b, respectively. The accordion folding hood 46 preferably has pleated folding sections 50 arranged between associated hood support members 52, the support members 52 being shown and described in further detail in connection with FIGS. 4, 5 and 8–11.

Also shown in FIG. 3 is the sleeping pad support panel 54 mentioned above, the panel 54 being preferably hinged at 56 for relative pivotal movement of its rearward portion 58 with respect to its forward portion 60. The forward portion 60 of panel 54 preferably rests horizontally across shifted rear seat 62 and folded rear seat back 64, and extends back through the rear luggage/storage compartment of vehicle 40. Rear bumper 66 on vehicle 40 is mounted for pivotal movement with respect to the vehicle 40 about an axis which substantially coincides with the axis of hinge assembly 44, the bumper 66 being arranged to move in unison with the moveable body portion 42a, as detailed later in connection with FIGS. 6 and 7.

Also shown in FIG. 3 is a pivoted locking and support brace 68 which is preferably provided and joined at its ends to the body portion 42a and the vehicle body 42b, L respectively, as shown. Further, if desired, rear window glass 70 may be hinged as at 72 to allow the glass 70 to swing out and away from the rear end of the sleeping pad support panel 54, should an occupant desire to open the glass 70 when using the expanded vehicle 40 in its expanded configuration.

An interior view of the vehicle 40 as expanded in FIG. 3 is given in FIG. 4. The accordion folding hood 46 and other portions of the vehicle 40 are omitted for purposes of clarity. In FIG. 4, hood support members 52 are shown in their expanded configuration, pivotally separated from one another about an axis which substantially coincides with the axis of hinge assembly 44.

Figure 10:
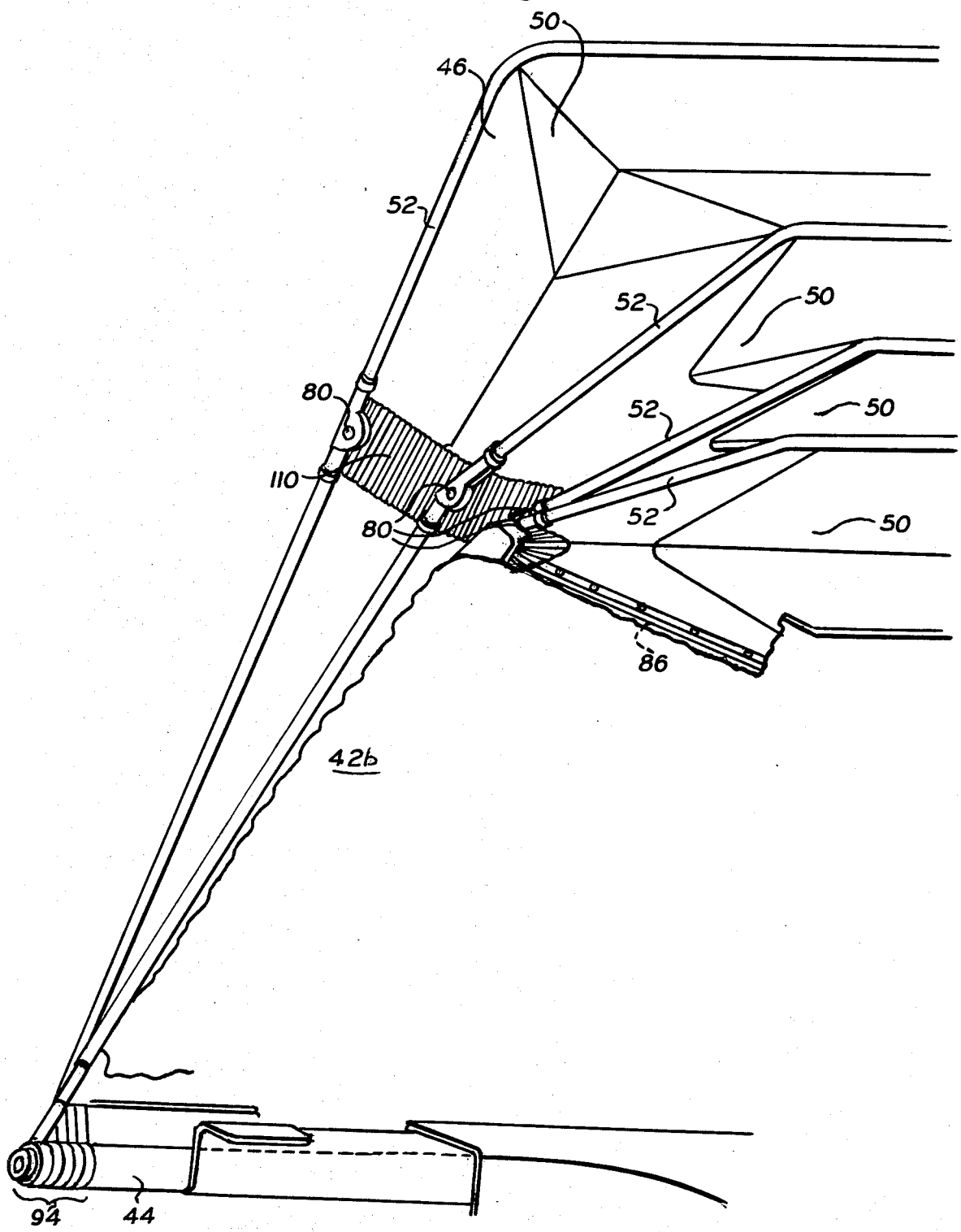
FIG. 10 is a perspective view of a folding hood and hood support members in accordance with the present invention, such as for use with the embodiment of FIG. 2.

Regarding hood support members 52, each of the members 52 preferably has a hinged joint 80, described and shown in further detail in FIGS. 10 and 11. The joints 80 allow the upper portions of each of the hood support members 52 to preferably fold sideways in unison with the folding hood (unshown) and into a hood storage compartment which is shown and will be described in greater detail in connection with FIGS. 5 and 12.

A sleeping pad 82 is shown in FIG. 4 as preferably placed over support panel 54, the rear portion 58 of the panel 54 preferably being swung out to occupy the rear of the expanded compartment in vehicle 40. As noted earlier, the narrowest portion of the sleeping pad 82 (and support panel 54) is defined by the distance between wheel wells 84, this distance being approximately three feet, four inches (101.6 cm) wide for the 1977 ∓Volkswagon Rabbit".

In FIG. 5, a preferred arrangement is shown in which folding good 52 is collapsed into the hood storage compartment 86 preferably defined in part by a "U"-shaped channel. Compartment 86 is preferably contiguously joined to and extends from confronting edge 48b of the vehicle body 42b within the interior of the vehicle 40. Body portion 42a is illustratively shown in FIG. 5 as being rearwardly exploded away from the vehicle body 42b for purposes of clarity. As shown in FIG. 5, hood storage compartment 86 preferably has a generally flattened "U"-shaped cross section of sufficient width to accommodate hood 46 when folded in unison with its associated support members 52, the members 52 preferably collapsing adjacent one another to define as essentially flat row of collapsed support members 52 within the compartment 86 as shown in FIG. 5.

The "U"-shaped compartment is contiguously joined to and follows the "dog leg" contour of the confronting edge of vehicle body 42b. The compartment 86 therefore extends inwardly and across the top of the rear luggage/storage compartment of the vehicle 40. The lower ends of the channel 86 are joined to the lower interior body portion of the vehicle body 42b as shown in FIG. 5.

Preferably joined to the interior surface of body portion 42a is a hood compartment cover 88 which is shaped to accommodate portions of the folding hood 46, hood support members 52 and support member hinge joints 80 which may extend up above the compartment 86 after the hood 46 is collapsed and stored therein upon movement of the body portion 42a to its closed configuration.

Figure 6:
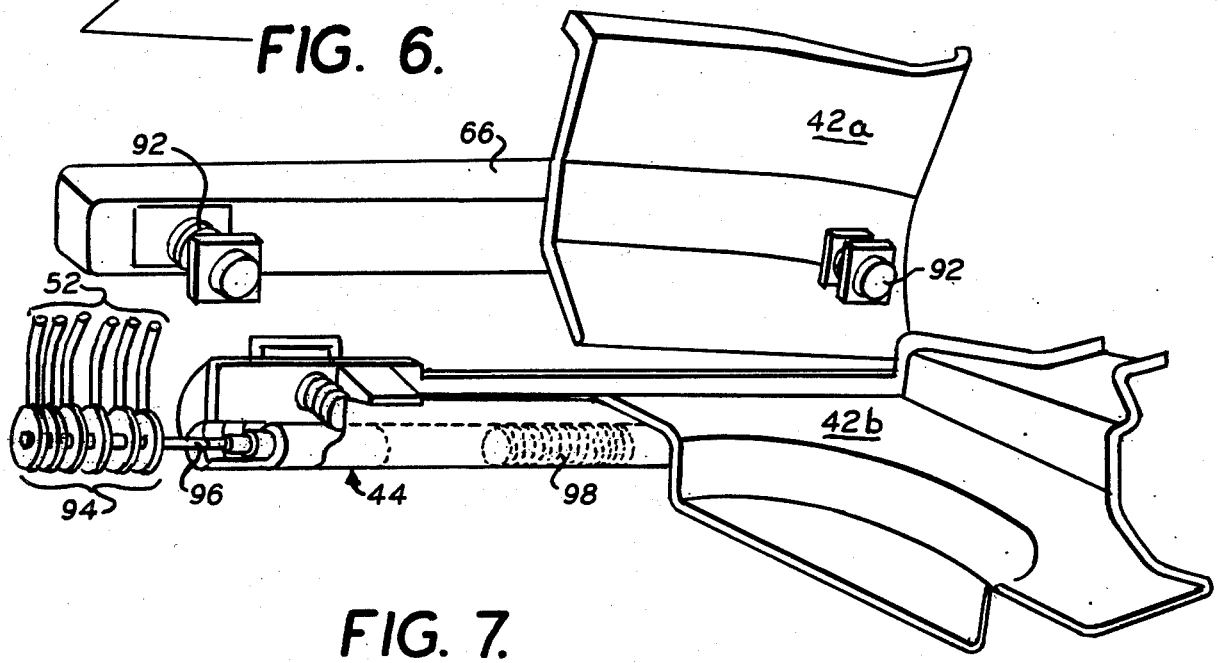
FIG. 6 is a fragmentary perspective detailed view of the vehicle as shown in FIG. 2, illustrating the impact load transferring arrangement between the rear bumper and the main body panels.

Also shown in FIG. 5 is a portion of the hinge assembly 44, this assembly being shown in further detail in FIGS. 6, 8 and 9. As may be seen genrally in FIG. 5, hinge assembly 44 in addition to its normal function of joining the body portion 42a to the vehicle body 42b for relative pivotal movement, acts to pivot each of the hood support members 52, the ends of each of the support members 52 being connected for said pivotal movement about the axis of hinge assembly 44 in the vicinity of each end of the hinge assembly 44 as shown in FIG. 5.

The movable body portion 42a is shown in FIG. 5 as exploded away from the vehicle body 42b merely for purposes of clarity, with the lower end of body portion 42a in actuality being joined to the vehicle body 42b for relative pivotal movement preferably by joining the lower edge of the body portion 42a for pivotal movement about the axis of hinge assembly 44, this construction is shown in detail and discussed later in regard to FIGS. 6–9.

Two openings 90 are preferably provided through the body portion 42a in the vicinity of the lower left and right sides thereof, respectively, and are preferably dimensioned to allow conventional type bumper shock absorbers 92 to pass therethrough. These shock absorbers 92 are shown in FIGS. 6 and 7 and will be described in greater detail in connection therewith.

Figure 7:
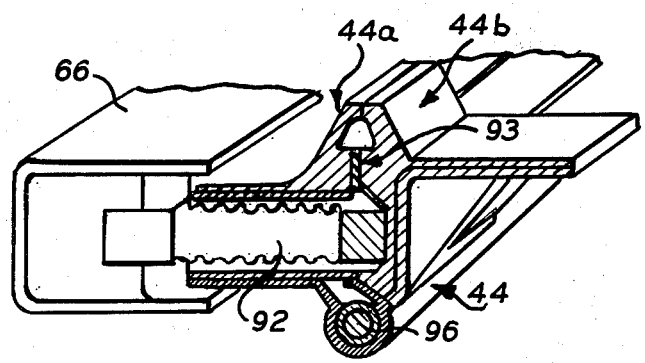
FIG. 7 is a fragmentary perspective sectional detailed view of the hinge at the point of the rear bumper mount of the impact load transferring arrangement of FIG. 6.

FIGS. 6 and 7 illustrate the pertinent portions of the preferred arrangement for the hinge assembly 44 and rear body panel or movable portion 42a which is designed to transfer impact loads from the rear bumper 66 of the vehicle through the hinge 44 to the main body panels 42b during normal use, which hood 46 is closed (FIG. 2) while also enabling the pivotal movement of portion 42a and the subsequent opening of hood 46 to provide the increased enclosed volume (FIG. 3). Thus, FIG. 6 illustrates portions of movable portion 42a, vehicle body 42b, and bumper 66, which has shock absorber assemblies 92 extending sideways therefrom at both of its ends, which copperate to provide the aforementioned preferred arrangement. The lower end portions of the hood support members 52 are also illustratively shown in FIG. 6, with each of the support members 52 having a boss 94 at its lower end for pivotally engaging a rod 96 which extends axially through the hinge assembly 44. As also shown and preferred in FIG. 6, a closing assist spring 98 is preferably disposed along and concentrically about the hinge assembly 44, with the spring 98 preferably acting to assist movement of the body portion 42a towards the closed position (FIG. 2) during such movement, such as by hand, of the body portion 42a to help facilitate such closure. Further details regarding spring assembly 98 and its mounting in relation to the body portion 42a, vehicle body 42b and hinge assembly 44 are discussed below in regard to FIGS. 8 and 9.

Referring now to FIG. 7, rear bumper 66 and its manner of mounting to the rear panel 42a and hinge assembly 44 to facilitate the aforementioned preferred arrangement is shown in section. As shown and preferred in FIG. 7, bumper 66 is mounted to the plunger end of the shock absorbers 92, with the other end of the shock absorbers 92 preferably being joined to hinge assembly 44 for pivotal movement about the rod 96. Thus, when the body portion 42a is in its closed position (FIG. 2) bumper 66 assumes its normal orientation at the rear of vehicle 40 and impact loads from the bumper 66 are transferred through the hinge assembly 44 to the vehicle body or main body panels 42b. As also shown and preferred in FIG. 7, a rubber pad 93 is provided at the junction point between the two opposing halves 44a and 44b of hinge assembly 44. In addition, as illustrated by FIGS. 3 and 7, the hinge assembly 44 is also preferably designed to allow the bumper 66 to rotate outward and down as the rear hinged panel 42a is moved to its open or expanded position (FIG. 3).

From the foregoing description of the expandable vehicle 40, it will be apparent that all of the component members thereof which move when vehicle 40 is either placed in its open or expanded configuration or brought back to its closed or normal running configuration are each preferably pivoted about the same axis, i.e. the rod 96 running through hinge assembly 44. Thus, hinge assembly 44 provides a pivotal axis for the body portion 42a which swings out from the vehicle body 42b, and also preferably provides the same axis by way of rod 96 for each of the hood support members 52.

Referring now to FIG. 8, a perspective view of hinge assembly 44 as viewed from the rear left side of vehicle 40 is shown. Movable body portion or rear panel 42a is omitted from FIG. 8 for purposes of clarity; however its connection to the hinge assembly 44 will be described below.

A second hinge assembly 44, which is not shown in FIGS. 8 and 9, is preferably mounted at the rear right side of vehicle 40 in such a way that the bosses 94 of hood support members 52 which are opposed to those shown in FIG. 8 preferably engage a second rod 96 disposed in the second hinge assembly 44 in the same manner as those shown in FIG. 8. The components which comprise the second hinge assembly 44 are therefore preferably identical to those described herein in connection with hinge assembly 44 in FIGS. 8 and 9, with the second hinge assembly 44 preferably being mounted in the vicinity of the right rear side of vehicle body 42b in substantially axial alignment and in a 180 degree orientation with respect to the hinge assembly 44 shown in the drawing.

As further shown and preferred in FIGS. 8 and 9, a channel member 100 is joined along one side thereof to a lower rear body portion of vehicle body or stationary body frame 42b. Channel member 100 is preferably U-shaped and disposed transverse to the longitudinal axis of vehicle 40 at a location proximate to the lower rear edge of vehicle 40. A conventional rubber boot 101 is also preferably provided to extend at one end thereof from beneath channel member 100 to join to the movable body portion 42a for providing weather sealing.

In the preferred embodiment, hinge assembly 44 is fixedly joined to channel member 100 preferably by way of bushings 102, 106 and 107 (FIG. 9) which support rod 96 in proper alignment. Bushing 104 is also provided about axle rod 96 for smooth rotational movement therearound, and is fixedly joined by way of its flange 105 to movable body portion 42a (not shown). In addition, one end of spring 98, as shown and preferred in FIGS. 8 and 9, extends out through a vertical slotted opening 107 on the left side of bushing 102, and engages the movable body portion 42a, while the other end of spring 98 is fixedly secured as by projecting through opening 108 on stationary bushing 102.

Turning now to further details of the accordion folding hood 46 and hood support members 52, references will be made to FIGS. 10 and 11. Accordion hood 46 is preferably constructed of very light weight fabric which is tight woven so as to shed water but which can still breathe, an example being tenting nylon. The hood 46, shown in a partially expanded position in FIG. 10, preferably has pleated fold sections 50 arranged between adjacent upper portions of the hood support members 52, with the support members 52 each being preferably joined to the hood 46 about its outer surface so as to cause the pleated sections 50 of hood 46 to fold inwardly when the support members 52 are collapsed as explained below.

In order to allow the folding hood 46 to be folded for storage within storage compartment 86 on the vehicle body 42b, a foldable, preferably pleated, fabric strip 110 is provided along the sides of the hood 46, as shown in FIG. 10, the strip 110 following a path which lies adjacent each of the hood support pivot joints 80 whereat the hood material 46 preferably becomes folded when the upper portions of the hood support members are swung down into the storage compartment 86. Fabric strip 110 is preferably a hypalon coated stretch fabric, or its equivalent, having sufficient characteristics to withstand the folding stresses imparted thereto by the folding joints 80. Thus, for example, strip 110 may comprise an elastomeric membrane instead of the aforementioned stretch fabric.

Referring now to FIG. 11, hinge joints 80 are shown in a folded over position, with the associated hood support members 52 being collapsed towards one another. It is preferred that each of the hinge joints 80 be of such construction as to swing the upper portions of hood support members 52 through an arc of about 75 degrees to accommodate the preferred "dog leg" bend for the embodiment of FIG. 2 which bend is defined by the confronting edge 48b and storage compartment 86 on vehicle body 42b. When the hood 46 is brought to its expanded configuration, it is preferred that hinge joints 80 each have locking means thereon for maintaining each of the hood support members 52 in a straight line, thereby providing additional stability to the expanded hood 46. For example, each of the hinge joints 80 may preferably comprise a stainless steel hood 112 having dimples 114 thereon, with the dimples 114 gripping around the edge of a stainless steel shank 116 to steadily maintain the movable upper portions of the support members 52 in alignment with the lower straight portions thereof. The shank 116 is preferably mounted within stainless steel hood 112, such as by a pivot pin 118 which engages registered openings provided through stainless steel hood 112 and shank 116. Thus, as the upper portions of hood support members 52 are swung down into storage compartment 86, the dimples 114 are forced past shanks 116 to thereby spread the sides of stainless steel hood 112 apart until the dimples 114 are moved past the opposite side of the shank 116.

Referring now to FIG. 12, the hood 46 storage compartment 86 is preferably contiguously joined to the vehicle body 42b in the vicinity of its confronting edge 48b. Similarly, the complimentary hood 46 storage compartment 88 is preferably joined to the movable body portion 42a in the vicinity of its confronting edge 48a. The compartments 86 and 88 are illustratively shown in a mating configuration in FIG. 12, with the folding hood 46 being enclosed within them.

The aforementioned confronting edge 48a of the movable body portion 42a is preferably formed with a concave lip as shown in FIG. 12, and a gasket 120 is preferably sealed against the concaved lip surface. A weather proof seal is thereby provided when the movable body portion 42a is brought to the closed position (FIG. 2), the gasket 120 then preferably being compressed against a reglet 122 mounted on the exterior of vehicle body 42b in the vicinity of its confronting edge 48b. As also shown and preferred in FIG. 12, the accordion folding hood 46 is joined at its opposite ends to the interior surfaces of body portion or rear panel 42a and vehicle body 42b, for example, by way of molding strips 124, 126, respectively. Further, the complimentary compartments 86 and 88 preferably have confronting edges 128, 130, respectively, which are preferably brought into abutting relationship when the movable body portion 42a is closed. Of course, although it is presently preferred, it is not necessary that edges 128 and 130 abut one another, the weather proof seal which is provided by gasket 120 and reglet 122 being of greater importance for purposes of such sealing.

The expandable vehicle 40 in the embodiment of FIG. 2 described above with reference to FIGS. 2-12, is preferably capable of being placed in an open or expanded configuration simply by hand, with the movable body portion or real panel 42a being maintained in tis expanded position preferably by way of the support brace 68 shown in FIG. 3. Similarly, movement of the body portion 42a back to its closed or unexpanded position may also be easily carried out by hand, with a torsional assist preferably being provided by way of the closing assist springs 98 detailed in connection with FIG. 9, or by such other conventional torsional assist mechanism as may be provided. Such ability to accomplish the above by hand becomes particularly important where size and weight are critical factors, such as in the instance of a compact car.

When in its closed position, the body portion 42a is preferably securely joined to the vehicle body 42b such as by a conventional manually operated latching mechanism or other such means which, being conventional, are not shown in the drawing. The latching mechanism, such as used in conventional "hatchback" automobiles, also operates to maintain a tight compression seal between the reglet 122 extending proximate the confronting edge 48b of the vehicle body 42b, and the gasket 120 which extends about the confronting edge 48a of the movable body portion 42a. As explained above, such a seal is preferably required to insure weather proofing of the interior of the vehicle 40 when in its normal running configuration (FIG. 2).

If desired, however, if size, weight and expense are not critical, an electrically operated drive mechanism may be used for opening and closing the movable body portion 42a, such as the drive mechanism to be described in greater detail with reference to the van type of automobile type vehicle 140 to be described hereinafter with reference to FIGS. 13, 14A-14C, 15, 16 and 17A-17E.

With respect to FIGS. 13, 14A-14C, 15, 16, and 17A-17E, the basic underlying concept upon which the present invention is based may be applied to any type of automobile type vehicle if desired, with the embodiment shown in these figures being directed to modification or use in a standard van type of vehicle, such as a 1977 "Volkswagon Van". In particular, FIGS. 13 and 14A-14C illustrate such a van type vehicle 140 having an expandable accordion hood 144 attached to portions thereon in accordance with the present invention for increasing both the headroom and the usable enclosed volume of the van 140. In FIG. 13, the expandable van 140 has a movable side body portion or panel 142a, as opposed to rear body portion or panel 42a of the embodiment of FIG. 2, which is connected to the van body 142b for pivotal movement about an axis substantially parallel to and in the vicinity of the lower left side edge of the van 140, As will be described in greater detail hereinafter, the principles of operation of the expandable van 140 are essentially identical to that previously described with reference to the embodiment of FIG. 2 except for the preferred use of the electrically mounted drive mechanism due to the relative size and weight of the movable side panel 142a. Thus, accordion folding hood 144 is preferably joined at opposite ends thereof to the body portion 142a and the van body 142b, respectively. In the preferred embodiment of FIG. 13, confronting edge 146a of the movable body portion 142a defines a "dog leg" bend (similar to the "dog leg" bend in the embodiment of FIG. 2) so that, when the folding hood 144 is in its open or expanded configuration, a relatively high vertical clearance or increased headroom will be obtained within the enclsoed expandable compartment as compared to the height or headroom available within the van 140 in its closed or unexpanded configuration. A series of hood support members 148, each having hinge joints 150 disposed on both sides thereof, allow the folding hood 144 to be collapsed within a hood storage compartment 152 which is contiguously joined to the van body 142b in the vicinity of its confronting edge 146b. Further structural details with respect to the opening and closing of the hood 144 are preferably identical with now be readily apparent to one of ordinary skill in the art from the foregoing disclosure. Accordingly, such description will not be repeated herein.

As mentioned above in connection with the expandable vehicle 40, it may sometimes be desirable to provide an electrical drive mechanism for opening and closing the movable body portion 42a. The use of such a drive mechanism is presently preferred in the embodiment of FIG. 13 and will now be described below in relation to the expandable van 140 shown therein. This mechanism can readily be adapted for use in combination with the expandable vehicle 40, if desired.

Figure 14A:
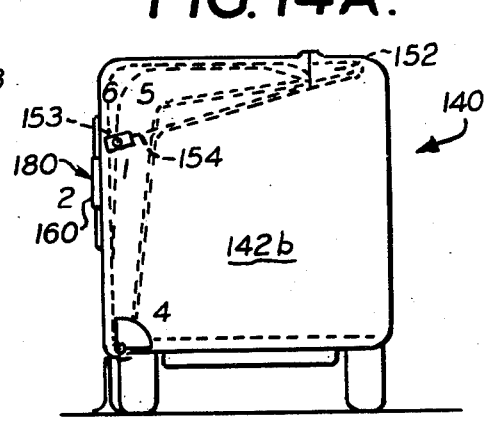
FIGS. 14A-14C are rear elevational views of the vehicle of FIG. 13 illustrating three stages of expansion from closed, to partially open, to fully open, respectively.
Figure 14B:
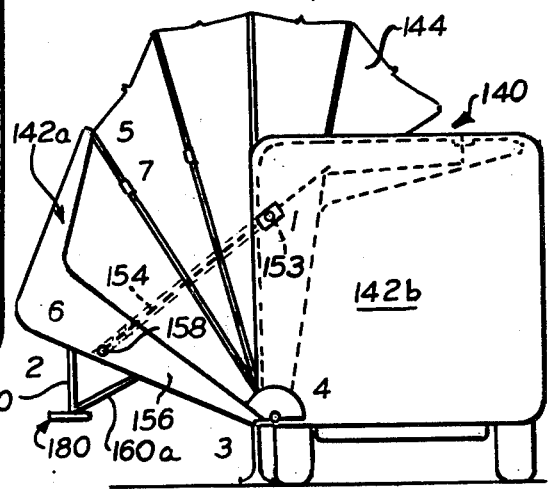
Figure 14C:
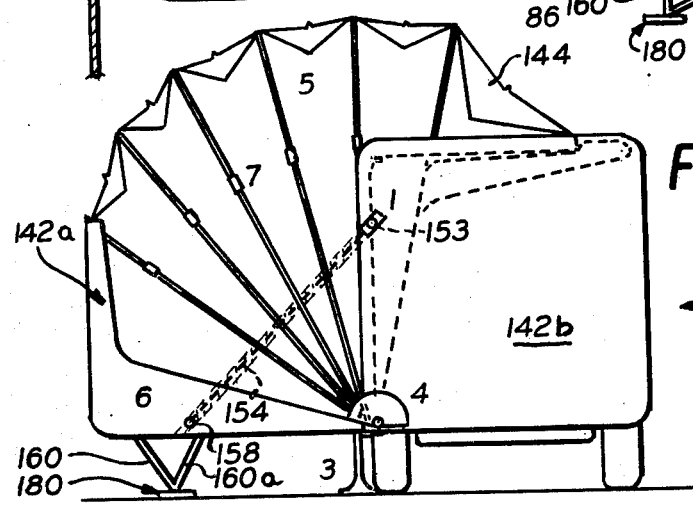

Referring now to FIGS. 14A-14C, the van 140 as it appears from the rear and is brought from a closed or unexpanded configuration (FIG. 14A) through a partially open or expanded configuration (FIG. 14B) to a fully open or expanded configuration (FIG. 14C) is illustratively shown. Thus, as shown and preferred in FIGS. 14A–14C, and in more detail with reference to FIGS. 15 and 16, a pair of spaced apart conventional electric drive motors 153 are mounted for pivotal movement about an axis running horizontally lengthwise of the vehicle 140 (perpendicular to the drawing) as detailed further below in connection with FIGS. 15 and 16. Each of the drive motors 153 and their associated interconnection to the movable body portion 142a is preferably identical, with only one such typical interconnection being described hereinafter. The pair of motors 153 are preferably located at each of the ends of the movable body portion 142a. Electric drive motor 153 preferably operates to threadably engage and move a threaded rod 154 through a correspondingly threaded bore within the rotor of motor 153, one end of the rod 154 being pivotally connected to a sidewall 156 of the movable body portion 142a at 158. It will be understood that the respective locations of the motor drive units 153, the pivotal connection points 158 and the overall length of the threaded rod 154 must be suitably chosen so that when the vehicle 40 is in its closed configuration (FIG. 14A) the unconnected end of the rod 154 will lie wholly within the hood storage compartment 152, or within some other portion at the top of the vehicle 140 without interference by any part of the body structure thereof.

As mentioned above, motor unit 153 has a threaded bore extending through the rotor thereof, with the threads in the bore engaging the corresponding threads on the rod 154. Thus, as the rotor in the motor unit 153 is caused to rotate as by energization of motor unit 153 by an outside electrical source, threaded rod 154 is moved forward or backward with respect to the motor unit 153, depending upon the sense of rotation of the rotor. As further shown and preferred in FIG. 15, one end of the rod 154 is pivotally connected at 158 to the movable body portion 142a of the van 140 so as to raise or lower the body portion 142a depending upon the sense of rotation of the motor 153. A collapsible plastic tube 164 is preferably provided between the pivot point 158 and the motor 153 along the length of the rod 154, so as to protect rod 154 from weather elements when vehicle 140 is in its expanded configuration and rod 154 is fully extended out from the side of the vehicle 140. As also shown and preferred in FIG. 15, the motor unit 153 is mounted on a structural frame 162 for providing free pivotal movement of the motor unit 153 about an axis substantially parallel to the pivotal axis provided for body portion 142a, owing to the fact that the threaded 154 will urge the motor unit 153 to swing about such an axis as the body portion 142a is raised or lowered. Thus, for example, an open housing 165 may be defined along the length of the frame 162, and the motor unit 153 be mounted for such free pivotal movement within housing 165 as by a pivotal connection 168 at both sides of the housing 165.

Summarizing the above, FIG. 16 is a diagrammatic illustration of the preferred geometry of the drive motor 153 and threaded rod 154 during opening and closing of the movable body portion 142a of the van 140. Thus, as stated above, the motor 153 is mounted in a manner which allows it to pivot as the threaded rod 154 passes through an arch while opening or closing movable body portion 142a with the path of the rod 154 during such opening and closing being indicated by the dotted line having reference numeral 170 in FIG. 16 and with the path of the end of the rod 154 during such opening and closing being indicated by the dotted line having reference numeral 172 in FIG. 16. In this regard, it should be noted that the position of the threaded rod 154 when movable body portion 142a is closed preferably corresponds to the angle of accordion hood 144 storage. the aforementioned electric drive mechanism 153–154 thus serves to push open the side 142a of the van 140 to the expanded position (FIG. 14C) as well as to lift the moving side 142a shut into its closed position (FIG. 14A). In addition, it preferably serves to cinch shut the moving side 142a which compresses the accordion hood 144 into its closed position while also compressing weather seals (not shown) at the edges of the moving side 142a to allow the main closing latch (not shown) to be fastened.

Lastly, as shown and preferred in FIGS. 14A–14C and particularly in FIGS. 17A–17E, a pair of hinged supports stands 160 are preferably provided on the outside wall of the movable body portion 142a, with each stand 160 preferably sliding flush against the outside wall (see FIGS. 17A and 17E) when the van 140 is in the closed position (FIG. 14A). Thus, as shown and preferred in FIGS. 17A–17E, as the moving panel 142a is lowered into the open position (FIGS. 14C and 17C) from the closed position (FIGS. 14A and 17A) through the various partially open positions (FIGS. 14B and 17B), the support stand 160 swings down into the fully open position shown in FIGS. 14C and 17C and 17D. Support stand 160 preferably works by gravity and is moved into place as the weight of the weighted support foot 180 falls downward. As the foot 180 touches the ground it preferably lifts the sliding braces 160a and 160b attached thereto to engage with a row of locking teeth in a toothed track 182a and 182b, respectively, as the weight of the panel 142a settles onto the foot 180 and, along with a pivotally mounted fixed hinge third brace 160 for foot 180, maintain a rigid triangular brace 160a–160b–160c. Upon closing, a similar reverse procedure occurs which is conventionally assisted by means of a counterweight 184 (FIG. 17D).

While specific embodiments of the present invention have beem disclosed hereinabove, it will be understood that most kinds of vehicles can be modified or originally designed according to the teachings of the present invention. Thus, while a standard passenger automobile and a conventional van have been illustrated herein as modified according to the present invention in a predetermined manner, many other type vehicles may be similarly modified or designed, or the manner of modification may be varied, such as for example the rear panel as opposed to the side panel of the van could be movable to provide the expanded configuration or the types of arrangements illustrated by FIGS. 1A–1C and FIGS. 1G–1I could be emploed instead of the arrangement of FIGS. 1D–1F.

Expanded vehicles in accordance with the present invention will find uses in the fields of education, recreation, medical assistance and creative arts, as well as in the military.

Modifications and variations of an expandable vehicle in accordance with the present invention will be readily apparent to a worker skilled in the art. It is therefore intended that all such modifications and variations be included within the spirit and scope of the present invention as defined in the appended claims.

It should be noted that as used throughout the specification and claims, the term "automobile type vehicle" is meant to include cars of all types, vans and campers.

What is claimed is:

1. An expandable vehicle comprising a vehicle body defining an outer configuration for the vehicle, said vehicle body comprising a movable body panel member and a stationary body frame; and means for joining said movable body panel member to said stationary body frame along a pair of confrontable edges disposed in a plane defining the diagonal of an original enclosed usable volume, said joining means comprising a collapsible accordion type hood and means pivotally connecting said movable body panel member to said stationary body frame for pivotal movement about a pivot axis, said movable body panel member being pivotally movable about said pivot axis through an angle of substantially 90 degrees from a closed position in which said confrontable edges substantially confront each other and said accordion type hood is collapsed to provide said original enclosed usable volume to an open position in which said accordion type hood is expanded to provide an enclosed expanded usable volume, said pivot axis being in a base plane through which said diagonal defining plane extends, said body panel member in said closed position substantially defining a half volume for said originally enclosed volume with said original enclosed volume being substantially bisected by said diagonal defining plane, said accordion type hood circumscribing a path of travel during said pivotal between said open and closed positions which describes an arch for creating an increased headroom for said enclosed expanded usable volume over that of said original enclosed volume which providing a total enclosed expanded volume greater than twice that of said original enclosed usable volume in said open position; whereby substantially the total vehicle enclosed volume may be used in both the open and closed positions of the body panel member with an increase in both headroom and volume being provided in the open position of the body panel member.

2. An expandable vehicle in accordance with claim 1 wherein said accordion type hood comprises means for providing a dog leg type bend therein for providing an offset from said diagonal defining plane.

3. An expandable vehicle in accordance with claim 1 wherein said body panel member and said stationary body frame are contiguous along a pair of normally opposed edges to define said original enclosed usable volume, said confrontable edges comprising said normally opposed edges, and said accordion type hood comprises means for extending said accordion type hood along said confrontable edges above said normally opposed edges.

4. An expandable vehicle in accordance with claim 1 wherein said movable body panel member comrpises a storage compartment for said collapsed accordion type hood for providing a substantially unaltered vehicular interior configuration in the closed position of said body panel member.

5. An expandable vehicle in accordance with claim 4 wherein a portion of said stationary body frame adjacent said movable body panel member comprises a storage compartment for said collapsed accordion type hood cooperable with and in communication with said body panel member storage compartment for providing said substantially unaltered vehicular interior configuration in the closed position of said body panel member.

6. An expandable vehicle in accordance with claim 1 wherein a portion of said stationary body frame adjacent said movable body panel member comprises a storage compartment for said collapsed accordion type hood for providing a substantially unaltered vehicular interior configuration in the closed position of said body panel member.

7. An expandable vehicle in accordance with claim 1 wherein said vehicle comprises an automobile type vehicle and said movable body panel member comprises a rear body panel of said automobile type vehicle.

8. An expandable vehicle in accordance with claim 7 wherein said automobile type vehicle comprises a rear bumper, said joining means comprising means for mounting said rear bumper to said rear body panel for enabling transfer of said impact loads from said rear bumper to said stationary body frame through said pivotal connection means in said closed position while enabling downward rotation of said rear bumper as said body panel member is moved to said open position.

9. An expandable vehicle in accordance with claim 8 wherein said pivotal connection means comprises a hinge means and said rear bumper mounting means comprises shock absorber means extending between said rear bumper and said stationary body frame in said closed position, said shock absorber means having plunger means therein with said rear bumper being mounted to said plunger means, said impact loads being transferable from said rear bumper through said hinge means to said stationary body frame in said closed position.

10. An expandable vehicle in accordance with claim 9 wherein said accordion type hood comprises means for providing a dog leg type bend therein for providing an offset from said diagonal defining plane.

11. An expandable vehicle in accordance with claim 10 wherein said movable body panel member comprises a storage compartment for said collapsed accordion type hood for providing a substantially unaltered vehicular interior configuration in the closed position of said body panel member.

12. An expandable vehicle in accordance with claim 11 wherein a portion of said stationary body frame adjacent said movable body panel member comprises a storage compartment for said collapsed accordion type hood collapsible with and in communication with said body panel member storage compartment for providing said substantially unaltered vehicular interior configuration in the closed position of said body panel member.

13. An expandable vehicle in accordance with claim 7 wherein said accordion type hood comprises means for providing a dog leg type bend therein for providing an offset from said diagonal defining plane.

14. An expandable vehicle in accordance with claim 13 wherein said movable body panel member comprises a storage compartment for said collapsed accordion type hood for providing a substantially unaltered vehicular interior configuration in the closed position of said body panel member.

15. An expandable vehicle in accordance with claim 14 wherein a portion of said stationary body frame adjacent said movable body panel member comprises a storage compartment for said collapsed accordion type hood cooperable with and in communication with said body panel member storage compartment for providing said substantially unaltered vehicular interior configuration in the closed position of said body panel member.

16. An expanded vehicle in accordance with claim 7 wherein said movable body panel member comprises a storage compartment for said collapsed accordion type hood for providing a substantially unaltered vehicular interior configuration in the closed position of said body panel member.

17. An expandable vehicle in accordance with claim 16 wherein a portion of said stationary body frame adjacent said movable body panel member comprises a storage compartment for said collapsed accordion type hood cooperable with and in communication with said body panel member storage compartment for providing said substantially unaltered vehicular interior configuration in the closed position of said body panel member.

18. An expandable vehicle in accordance with claim 7 wherein a portion of said stationary body frame adjacent said movable body panel member comprises a storage compartment for said collapsed accordion type hood for providing a substantially unaltered vehicular interior configuration in the closed position of said body panel member.

19. An expandable vehicle in accordance with claim 7 wherein said increased headroom in said open position provides standing room where the original headroom of said original enclosed volume did not.

20. An expandable vehicle in accordance with claim 7 wherein said automobile type vehicle comprises a compact car.

21. An expandable vehicle in accordance with claim 1 wherein said vehicle comprises an automobile type vehicle and said movable body panel comprises a side body panel of said sutomobile type vehicle.

22. An expandable vehicle in accordance with claim 20 wherein said joining means further comprises drive motor means for moving said side body panel between said open and closed positions.

23. An expandable vehicle in accordance with claim 21 wherein said joining means still further comprises means for pivotally mounting said drive motor means between said side body panel and said stationary body frame for effectuating said pivotal movement of said side body panel between said open and closed positions.

24. An expandable vehicle in accordance with claim 21 wherein said accordion type hood comprises means for providing a dog leg type bend therein for providing an offset from said diagonal defining plane.

25. An expandable vehicle in accordance with claim 21 wherein said automobile type vehicle comprises a van.

* * * * *